(12) United States Patent
De Haan

(10) Patent No.: US 8,730,689 B2
(45) Date of Patent: May 20, 2014

(54) CAPACITIVE POWER SUPPLY

(75) Inventor: Thijs De Haan, Drachten (NL)

(73) Assignee: Koninklijke Philips N.V, Eindhoven (NL)

( * ) Notice: Subject to any disclaimer, the term of this patent is extended or adjusted under 35 U.S.C. 154(b) by 131 days.

(21) Appl. No.: 12/744,354

(22) PCT Filed: Nov. 21, 2008

(86) PCT No.: PCT/IB2008/054902
§ 371 (c)(1),
(2), (4) Date: May 24, 2010

(87) PCT Pub. No.: WO2009/069055
PCT Pub. Date: Jun. 4, 2009

(65) Prior Publication Data
US 2010/0232193 A1    Sep. 16, 2010

(30) Foreign Application Priority Data
Nov. 27, 2007 (EP) .................................. 07121628

(51) Int. Cl.
*H02H 7/125* (2006.01)
*H02M 7/08* (2006.01)

(52) U.S. Cl.
USPC .............. 363/52; 363/126; 323/231; 323/908

(58) Field of Classification Search
USPC ............ 363/52, 67, 69, 125, 126; 307/11, 30, 307/38, 39; 361/93.9; 323/229, 231, 908
See application file for complete search history.

(56) References Cited

U.S. PATENT DOCUMENTS

| | | | | |
|---|---|---|---|---|
| 3,355,650 | A | * | 11/1967 | Tolmie .......................... 388/830 |
| 3,595,028 | A | * | 7/1971 | Schrader ...................... 62/176.6 |
| 3,753,071 | A | * | 8/1973 | Engel et al. ..................... 363/37 |
| 3,978,388 | A | | 8/1976 | De Vries |
| 3,982,174 | A | * | 9/1976 | Maddox ........................ 323/287 |
| 4,206,390 | A | * | 6/1980 | Jessup ........................... 318/469 |
| 4,320,282 | A | * | 3/1982 | McDonald et al. ..... 219/137 PS |

(Continued)

FOREIGN PATENT DOCUMENTS

| | | |
|---|---|---|
| DE | 2409884 A1 | 1/1975 |
| DE | 2645569 A1 | 4/1977 |

(Continued)

OTHER PUBLICATIONS

"Solid Aluminum Capacitors With Organic Semiconductor Electrolyte"; Vishay Company Product Description, Document No. 90009, pp. 325-328, Jan. 15, 2007.

*Primary Examiner* — Gary L Laxton

(57) ABSTRACT

A capacitive power supply including an input section having input terminals for connection to an AC-mains supply, and a capacitive coupling, a rectification section coupled via the capacitive coupling to the input terminals, and an output section coupled to the rectification section, the output section including output terminals, for providing an output voltage to a load, a first chain including a charge storage facility, and a second chain arranged in parallel to the first chain, and including an output voltage limiting facility, the capacitive power supply further including an inrush current limiting facility, wherein the output terminals are connected to respective terminals of the output voltage limiting facility, and the DC-conducting series impedance has a resistive component with a resistive value of at least 0.2 times a resistive value of the first chain.

6 Claims, 3 Drawing Sheets

(56) References Cited

U.S. PATENT DOCUMENTS

| | | | |
|---|---|---|---|
| 4,321,512 A * | 3/1982 | Alvord et al. | 315/411 |
| 4,546,305 A * | 10/1985 | Goddijn et al. | 323/299 |
| 4,591,728 A * | 5/1986 | Kruger et al. | 307/75 |
| 4,599,555 A * | 7/1986 | Damiano et al. | 323/351 |
| 4,642,537 A * | 2/1987 | Young | 318/400.35 |
| 4,870,528 A * | 9/1989 | Harford | 361/56 |
| 5,721,675 A * | 2/1998 | Lee | 363/44 |
| 5,953,221 A * | 9/1999 | Kuhn et al. | 363/53 |
| 6,366,058 B1 | 4/2002 | Honsberg | |
| 6,414,864 B1 * | 7/2002 | Hoshi | 363/69 |
| 6,493,245 B1 | 12/2002 | Phadke | |
| 6,646,842 B2 | 11/2003 | Pan et al. | |
| 6,657,418 B2 * | 12/2003 | Atherton | 323/282 |
| 6,744,612 B2 | 6/2004 | Chen | |
| 6,937,483 B2 * | 8/2005 | Zhu et al. | 363/17 |
| 7,292,462 B2 * | 11/2007 | Watanabe et al. | 363/60 |
| 7,403,406 B1 * | 7/2008 | Yang | 363/125 |
| 7,483,280 B2 * | 1/2009 | Benabdelaziz et al. | 363/44 |
| 7,808,219 B2 * | 10/2010 | Ye et al. | 323/224 |
| 2003/0214825 A1 | 11/2003 | Lee | |
| 2006/0034109 A1 | 2/2006 | Benabdelaziz et al. | |
| 2006/0274468 A1 | 12/2006 | Phadke | |
| 2007/0014134 A1 | 1/2007 | Shih | |

FOREIGN PATENT DOCUMENTS

| | | |
|---|---|---|
| DE | 19754239 A1 | 6/1999 |
| DE | 19934850 A1 | 1/2001 |
| DE | 102006054539 B3 | 2/2008 |
| GB | 2175463 A | 11/1986 |
| JP | 10150772 A | 6/1998 |
| JP | 2004242485 A | 8/2004 |
| SU | 1335957 A1 | 9/1987 |

* cited by examiner

CAPACITIVE POWER SUPPLY

FIELD OF THE INVENTION

The invention relates to a capacitive power supply. The invention further relates to an electronic device provided with a capacitive power supply.

BACKGROUND OF THE INVENTION

For various household appliances it is not possible to switch off the whole appliance, due to convenience of use or technical reasons. For example, in video and audio equipment it is desirable that the device remains standby so that is capable of receiving and processing remote control signals. Or the device may have a permanently active control clock for activating other modules of the device at a predetermined time.

Due to regulations and the desire for green electronic designs, however, standby power consumption of appliances should be limited to a minimum.

Often a capacitive power supply is used to supply the part of the electronics inside the appliance that should remain permanently active. The appliance may for example be a coffee-maker or a washing-machine, having a micro-controller for controlling various functions of the appliance. A capacitive power supply has a lower cost-price than other power supplies, as for example a conventional transformer or a switch-mode power supply. Examples of a capacitive power supply are disclosed in US2006/0034109A1. In a capacitive power supply a capacitance functions as an impedance that causes a voltage drop from the main supply voltage to a voltage to be used by the application. As the current through the capacitance is 90 degrees out of phase with the voltage across the capacitance, the capacitive power supply itself consumes substantially no power. In practice it is difficult to design the capacitive power supply such that the phase shift is exactly 90 degrees, as account has to be taken of additional constraints. One thereof is that the inrush current of the device, occurring if the device is attached to the mains or switched on by a mains switch, is limited to value at which damage to the supply is prevented. In addition it must be taken into account that peak voltages may occur at the mains supply that may reach values to 2 to 3 kV. It must be prevented that this deviations ripple through too much as variations into the voltage supplied by the capacitive power supply, and therewith may cause undesired situations. In an appliance as referred to above this could occur for example if the variations in the voltage supplied by the capacitive power supply damage the microcontroller. Usually the capacitive power supply therefore includes an inrush current limiter, usually in the form of a series resistance that reduces the inrush current. As a negative side effect however this series resistance dissipates power.

SUMMARY OF THE INVENTION

It is desirable to reduce such dissipation losses. The invention is defined by the independent claims. The dependent claims define advantageous embodiments.

According to an aspect of the invention a capacitive power supply comprises an input section having input terminals for connection to an AC-mains supply, and a capacitive coupling, a rectification section coupled via the capacitive coupling to the input terminals, and an output section coupled to the rectification section, the output section comprising output terminals for providing an output voltage to a load,
a first chain comprising a charge storage facility, and
a second chain arranged in parallel to the first chain, and comprising an output voltage limiting facility and a DC-conducting series impedance, the capacitive power supply further comprising an inrush current limiting facility, wherein the output terminals are connected to respective terminals of the output voltage limiting facility, and the DC-conducting series impedance has a resistive value of at least 0.2 times a resistance value of the first chain.

According to another aspect of the invention an electronic device comprises a power input for connection to a mains supply,
the above-mentioned capacitive power supply coupled to said power input, and
a first functional unit powered by said capacitive power supply.

As the second chain includes a DC-conducting series impedance, with a resistance value R of at least 0.2 times a resistive value of the first chain, the stress imposed to the inrush current limiting facility is released. Accordingly a higher inrush current is allowed without causing damage to the output voltage limiting facility and any circuitry coupled to the output terminals. Surprisingly, in an advantageous embodiment, even a rather small value of the impedance of the DC-conducting impedance (e.g. 2.2Ω) appeared to make it possible to lower a resistive value used for inrush current limitation by far more than the value of the DC-conducting impedance, e.g. from 270Ω necessary in the absence of the DC-conducting impedance to prevent too high peak voltages at the output from occurring, to only 100Ω in the presence of the DC-conducting impedance of 2.2Ω, without risking too high peak voltages. As the lower the inrush resistance is, the lower the power dissipation, this allows for a reduced resistive inrush current limitation, and thereby a reduced power dissipation of the capacitive power supply without requiring a more robust dimensioning of the voltage limiting facility. In particular embodiments the DC-conducting series impedance may even have a resistance substantially lower that the resistance of the inrush current limiting facility, thereby resulting in a substantial reduction of the dissipated power.

As the output terminals are connected to respective terminals of the output voltage limiting facility, the output voltage is still accurately determined by the output voltage limiting facility, e.g. a zener diode, which would not be the case if the output terminals were connected to the series connection of the output voltage limiting facility and the DC-conducting series impedance, as then the current through the series impedance would result in an undesired additional output voltage component.

In the device known from US2006/0034109A1, the chain comprising the zenerdiode DZ3 and the series resistance R3 merely serves for controlling the switch M. It is not disclosed that this zenerdiode should be released from stress by bypassing part of the inrush current to the storage capacitor C. Nor is it disclosed what value the resistance R3 should have to achieve this effect to a sufficient extent to sufficiently protect the zenerdiode. Also, like in DE19754239A1, the output terminals are connected to the series connection of the zener diode and the series resistance.

In practice components used for the charge storage facility may have variations in their internal resistance. Accordingly it may be necessary to reject components if they have a value for their internal resistance higher than their nominal value, if the ratio for the resistance value of the DC-conducting series impedance (Zdc) and the designed value of the internal resistance is selected close to 0.2.

Preferably therefore the DC-conducting series impedance (Zdc) has a resistive value R of at least 10 times a resistive value of the first chain. In this way the application in a mass fabrication process, where in practice variations occur in the characteristics of the components, is facilitated.

The maximum resistive value of the DC-conducting series impedance (Zdc) depends on the application that is supplied by the capacitive power supply. To achieve that the reduction in power dissipation is substantial, the maximum resistive value should be at most the resistive value of an inrush current limitation facility. However, if the application supplied by the capacitive power supply under circumstances requires a large peak current for its operation, it may be desirable that the maximum resistive value is at most 0.1 times the resistive value of an inrush current limitation facility. The DC-conducting series impedance may for example be a resistive element, but may alternatively be a more complex impedance, e.g. an inductive element in series with a resistive element. The resistive value of the first chain may be determined by an explicit series resistance in the first chain, by an internal resistance of a capacitive element forming the charge storage facility or both.

The inrush current limiting facility may be an impedance in the form of a resistive element, but may alternatively be a more complex impedance, e.g. a resistive element in series with an inductive element. The impedance is arranged as a series impedance between an input terminal and the charge storage facility. The series impedance may be part of the input section e.g. in a path coupled to one of the input terminals, for example in series with capacitive coupling, but may alternatively be part of the rectification section, or may be arranged between the rectification section and the output section. The inrush current limiting facility need not be a single impedance, but may comprise a plurality of impedances at the locations indicated above. In that case the resistance of the inrush current limiting facility is the sum of the resistances of the impedances arranged in series in a path from a first one of the input terminals via the charge storage capacitor to the second one of the input terminals. The capacitive coupling may include a capacitive series impedance in a chain from a first input terminal to the rectification section, in a chain from a second input terminal to the rectification section or in both.

BRIEF DESCRIPTION OF THE DRAWINGS

These and other aspects are described in more detail with reference to the drawing. Therein.

DETAILED DESCRIPTION OF EMBODIMENTS

In the following detailed description numerous specific details are set forth in order to provide a thorough understanding of the present invention. However, it will be understood by one skilled in the art that the present invention may be practiced without these specific details. In other instances, well known methods, procedures, and components have not been described in detail so as not to obscure aspects of the present invention.

A single component or other unit may fulfill the functions of several items recited in the claims. The mere fact that certain measures are recited in mutually different claims does not indicate that a combination of these measures cannot be used to advantage. Any reference signs in the claims should not be construed as limiting the scope.

It will be understood that when an element is referred to as being coupled to another element, it can be directly connected to the other element but alternatively intervening elements may be present between said element and the other element. In contrast, when an element is referred to as connected to there are no intervening elements present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, or section from another element, component, or section region, layer or section. Thus, a first element, component or section discussed below could be termed a second element, component or section without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
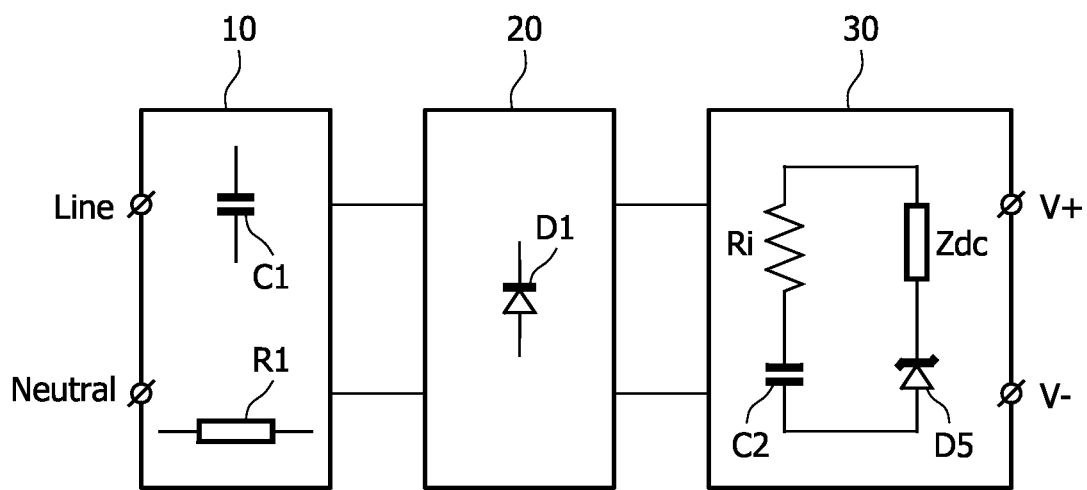
FIG. 1 schematically shows a first embodiment of a capacitive power supply according to the present invention.

FIG. 1 schematically shows a capacitive power supply comprising an input section 10, a rectification section 20 and an output section 30, as well as an inrush current limiting facility R1.

The input section comprises a first and a second input terminal Ln, Nt for connection to an AC-mains supply and a capacitive coupling C1.

The rectification section 20 is coupled via the capacitive coupling to the input terminals (Ln, Nt). The rectification section 20 serves to provide a rectified current to the output section 30.

The output section 30 coupled to the rectification section comprises a first and a second output terminal V+, V−, for providing an output voltage to a load. The output section 30 further comprises a first chain comprising a charge storage facility C2, and a second chain comprising a voltage limiting facility D5 arranged in parallel to the first chain.

The capacitive power supply further comprises an inrush current limiting facility R1. The inrush current limiting facility may for example be an impedance in series with the capacitive coupling, but may also be arranged in another part of the capacitive power supply.

The second chain includes a DC-conducting series impedance Zdc. The DC conducting impedance Zdc has a resistance value of at least 0.2 times the resistance value Ri of the first chain. The resistance value Ri of the first chain may be determined by an explicit series resistance in the first chain, by an internal resistance of a capacitive element forming the charge storage facility or both.

Figure 2:
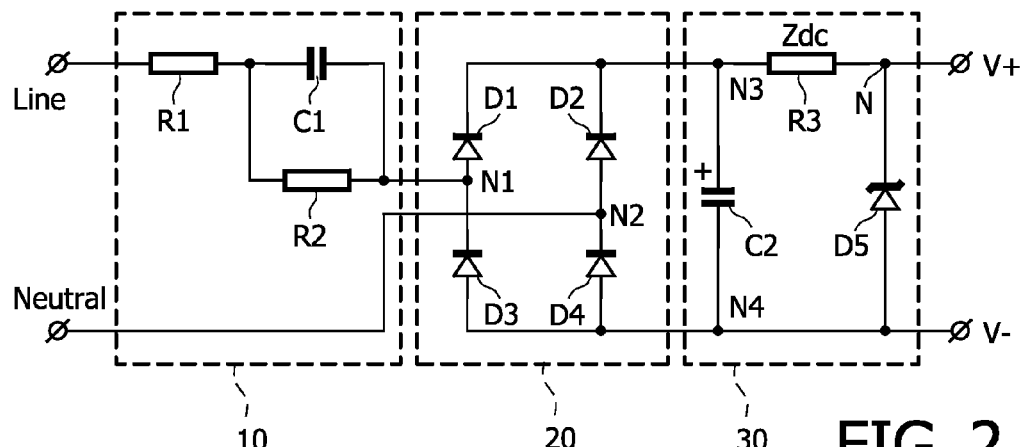
FIG. 2 shows a second embodiment of a capacitive power supply according to the present invention.

FIG. 2 shows an embodiment of a capacitive power supply according to the invention in more detail.

In the embodiment shown the first input terminal Ln is coupled via a resistive element R1 and a capacitive element C1 to a first input node N1 of the rectification section. The resistive element R1 functions as an inrush current limiting facility and the capacitive element C1 functions as a capacitive coupling between the input terminals of the input section 10 and the rectification section 20. The second input terminal Nt is directly coupled to a second input node N2 of the rectification section. Alternatively a capacitive element may be arranged between the second input terminal Nt and the second input node N2, or a capacitive element may be arranged both in the chain from input terminal to node N1 and in the chain from the other input terminal to node N2. The resistive element R2 functions as a discharge facility. Upon removal of the mains power, the capacitive element C1 discharges via the discharge facility R2. This is relevant for devices wherein the capacitive power supply is coupled by a plug to the mains to prevent that the user may incur an electric shock when disconnecting the supply from the mains. The discharge facility may be omitted for example in case the capacitive power supply is coupled by a fixed connection to the mains.

In the embodiment shown, the rectification section 20 is a full-wave rectifier D1-D4, known as such, having outputs coupled to input nodes N3, N4 of the output section 30.

The output section 30 has a first chain bridging the input nodes N3, N4 of the output section with the charge storage facility C2. Although not shown explicitly, the charge storage facility C2 will have an internal series resistance Ri.

The second chain comprises a voltage limiting facility D5 and is arranged in parallel to the first chain. The second chain includes a DC-conducting series impedance Zdc with a resistive value of at least 0.2 times the resistance value Ri of the first chain.

Figure 3:
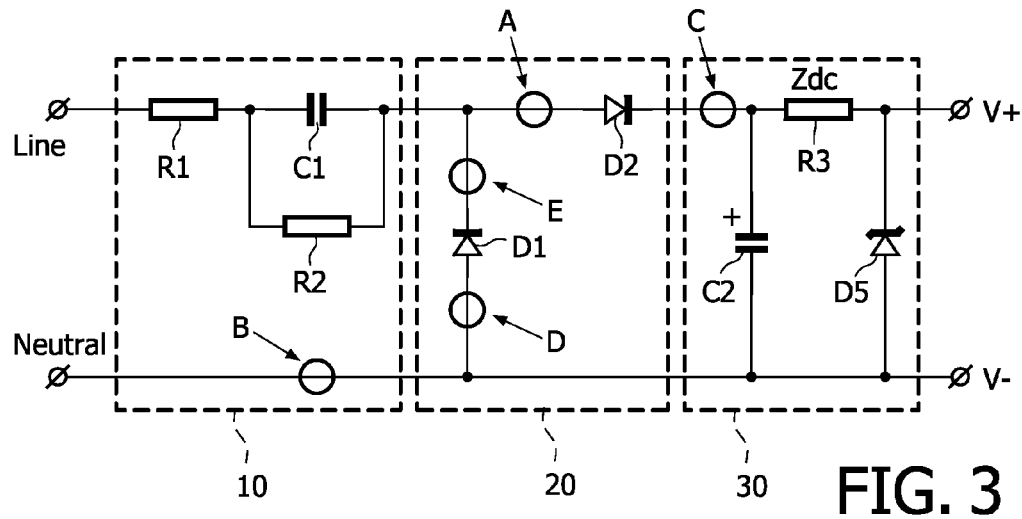
FIG. 3 shows a third embodiment of a capacitive power supply according to the present invention.

FIG. 3 shows a further embodiment in more detail. In the embodiment shown therein, the rectification section 20 is a half-wave rectifier formed by diodes D1, D2. In the embodiment shown the inrush current limiting facility is a resistive impedance R1 arranged in a first branch of the input section 10, in series with the capacitive coupling C1. Alternatively, it may be arranged in the second branch, which is coupled to the input terminal Nt, or each of these branches may have an inrush current limiting impedance. The inrush current limiting facility R1 need not be part of the input section 10, but may alternatively be part of the rectification section 20, e.g. when inserted at location A, or part of the output section 30 when inserted at location C. An inrush current limiting facility may comprise a combination of inrush current limitation impedance at location A or C in combination with further inrush current limiting impedances at location D and/or E to also protect a rectification element D1 in the rectification section. The resistive value of the input current limiting facility would in this case be the sum of the resistive values of the impedances R1, A, C and B arranged in series in a path from a first one Ln of the input terminals via the charge storage capacitor C2 to the second one Nt of the input terminals.

An inrush current limiting impedance may be an impedance in the form of a resistive element, but may alternatively be a more complex impedance, e.g. a resistive element in series with an inductive element.

Figure 4:
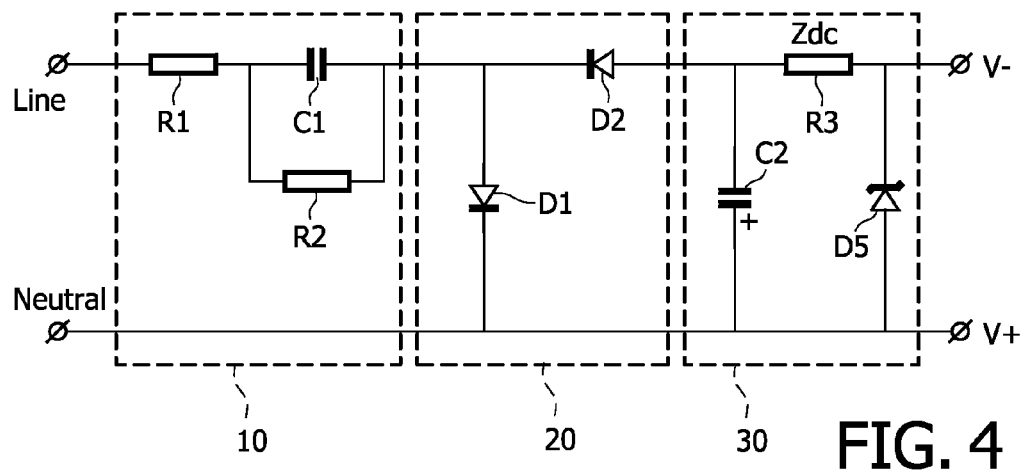
FIG. 4 shows a fourth embodiment of a capacitive power supply according to the present invention.

FIG. 4 shows an alternative version of the embodiment of FIG. 3, wherein the rectification section provides a voltage with reversed polarity.

By way of example the present invention was implemented on the basis of the embodiment shown in FIG. 4, using the following components:
D1 and D2 are 2N4007,
R1 is 100Ω
C1 is 470 nF
C2 is 470 µF having internal resistance of 100 mΩ.
D3 is BZX84C5V1 (5.1 V zener diode)
Zdc=R3=2.2Ω

The operation of the capacitive power supply was compared with the operation of a first conventional power supply, i.e. having a resistance R3 of 0Ω, as well as a second conventional power supply, also lacking the DC-conducting series impedance Zdc but having a higher value of 270Ω for the resistance of the inrush current limiting facility R1.

The standby power of the new circuit is 0.3 Watt against 0.5 Watt for the second conventional circuit. Hence, the power dissipation is substantially reduced.

With a surge of 2 kV and R3 is 0Ω, a voltage of 6.5 V was observed on the output V+, V− of the supply during the surge. This is in practice too high, for example for a load comprising a micro controller in the circuit.

When R3 is increased to 2.2Ω the output voltage rises only to 5.5 V during a surge of 2 kV, which is acceptable for the micro controller.

Accordingly the resistive value of the DC-conducting series impedance (Zdc) has a resistive component with a resistive value of at least 0.2 times a resistance value (100 mΩ) of the first chain C2. More in particular the DC-conducting series impedance (Zdc) has a resistive component with a resistive value of at least 10 times a resistance value (100 mΩ) of the first chain C2.

In particular the DC-conducting impedance Zdc has a resistive component R3 with a resistive value of at most 0.1 times a resistance value of the inrush current limiting facility R1 (100Ω).

Figure 5:
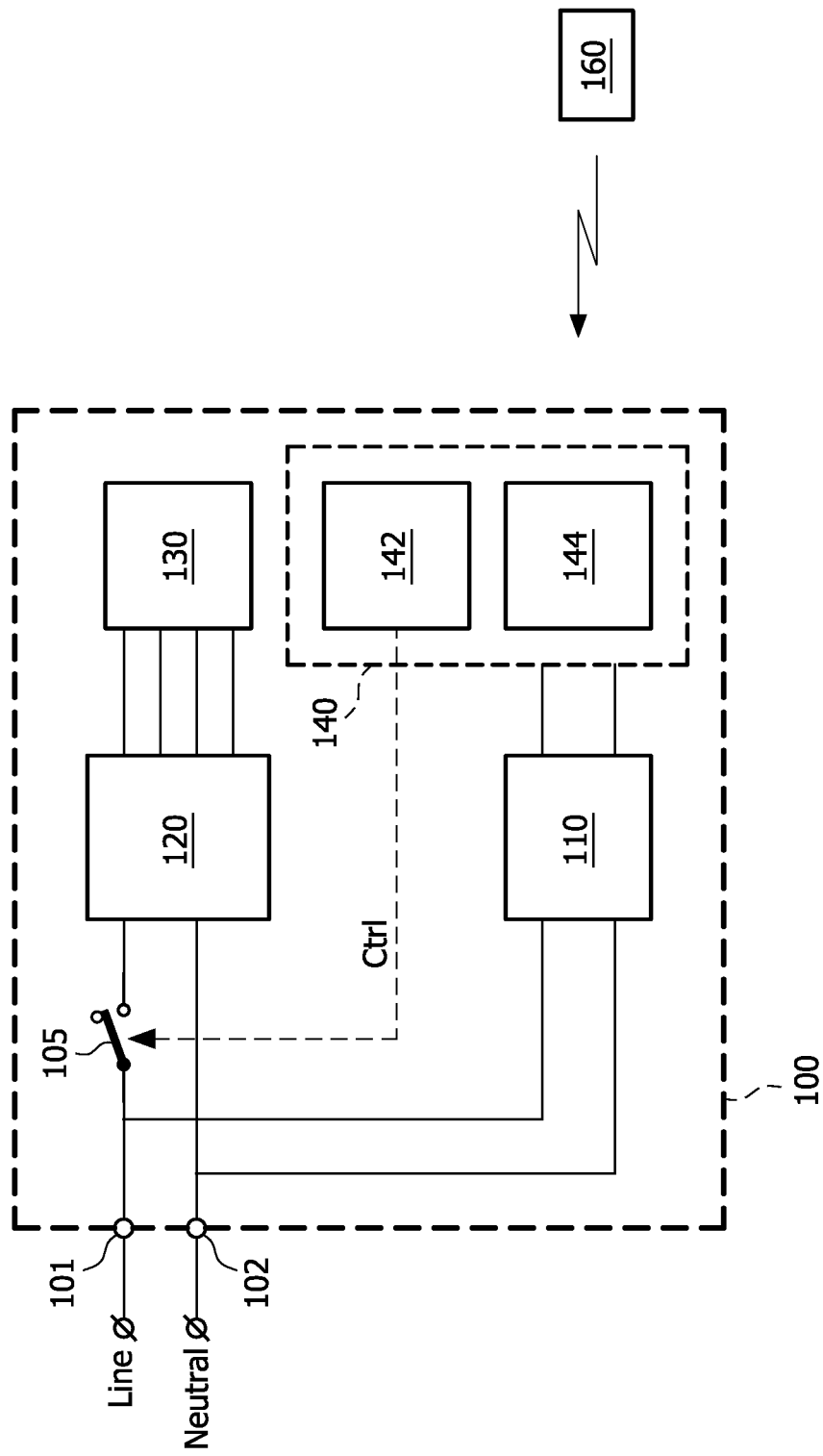
FIG. 5 shows an embodiment of an electronic device comprising a capacitive power supply according to the present invention.

FIG. 5 shows an electronic device comprising a power input 101, 102 for connection to a mains supply Ln, Nt. The electronic device has a capacitive power supply 110 according to the invention that is coupled to said power input 101, 102. A first functional unit 140 having modules 142, 144 is powered by said capacitive power supply 110.

In the embodiment shown the electronic device has a second power supply 120 coupled via a switching facility 105 to the power input 101, 102. A second functional unit 130 is powered by the power supply 120.

In particular the first functional unit 140 controls the switching facility.

In the embodiment shown the electronic device is a household appliance, here a coffee-maker. The first functional unit 140 is a user-interface comprising a micro-controller 142 and a display 144 that is permanently active. When the user indicates the device, e.g. by pressing a button, or by a signal from a remote control 160, the microcontroller 142 uses a control signal Ctrl to control the switch 105, e.g. a triac or other semiconductor switching element to switch on the second, main power supply 120 and therewith activate the second functional unit 130, which is e.g. a heating element in the coffee-maker.

Alternatively the electronic device may be another consumer device, e.g. a video or audio arrangement, wherein the main functional part of the device, e.g. a recording or display facility is activated by a permanently activated switching clock.

The terminology used herein is for the purpose of describing particular embodiments only and is not intended to be limiting of the invention. It should be noted that the above-mentioned embodiments illustrate rather than limit the invention, and that those skilled in the art will be able to design many alternative embodiments without departing from the scope of the appended claims. As used herein, the singular forms "a" and "an" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The invention claimed is:

1. A capacitive power supply comprising:
   first and second input terminals for connecting to an AC-mains supply;
   a rectification section;
   first and second output terminals for providing output voltage to a load;
   a first resistive element forming inrush current limiting facility configured to limit an inrush current and to directly couple to the first input terminal;
   a first capacitive element forming a capacitive coupling coupled in series to the inrush current limiting facility and the rectification section;
   a second resistive element forming a discharge facility coupled in parallel with the first capacitive element for discharging the first capacitive element to prevent an electric shock when the power supply is disconnected from the AC-mains supply;
   a second capacitive element forming a charge storage having an internal series resistance coupled in parallel with the rectification section; and
   a chain coupled in parallel to the charge storage and including a diode forming an output voltage limiting facility connected between the first and second output terminals to reduce dissipation losses of the inrush current limiting facility an to limit output voltage and third resistive element forming a DC-conducting series impedance having a resistive component with a resistive value of at least 0.2 times a resistance value of the internal series resistance.

2. The capacitive power supply according to claim 1, wherein the resistive value of at least 10 times the resistance value of the internal series resistance.

3. The capacitive power supply according to claim 1, wherein the resistive value is at most 0.1 times a resistive value the inrush current limiting facility.

4. An electronic device comprising:
   a capacitive power supply coupled to an AC-mains supply; and
   a first functional unit powered by said capacitive power supply and including:
      first and second input terminals for connection to the AC-mains supply, a rectification section, and first and second output terminals for providing output voltage to a load,
      a first resistive element forming an inrush current limiting facility configured to limit an inrush current and to directly couple to the first input terminal,
      a first capacitive element forming a capacitive coupling coupled in series to the inrush current limiting facility and the rectification section,
      a second resistive element forming a discharge facility coupled in parallel with the first capacitive element for discharging the first capacitive element to prevent an electric shock when the power supply is disconnected from the AC-mains supply;
      a second capacitive element forming a charge storage having an internal series resistance coupled in parallel with the rectification section, and
      a chain coupled in parallel to the charge storage and including a diode forming an output voltage limiting facility connected between the first and second output terminals to reduce dissipation losses of the inrush current limiting facility and to limit output voltage, and a third resistive element forming a DC-conducting series impedance having a resistive component with a resistive value of at least 0.2 times a resistance value of the internal series resistance.

5. The electronic device according to claim 4, further comprising:
   a second power supply; a switching facility for coupling the second power supply to the power input; and a second functional unit powered by said second power supply.

6. The electronic device according to claim 5, wherein the first functional unit controls the switching facility.

* * * * *